United States Patent [19]
Pomerantz

[11] 3,904,782
[45] Sept. 9, 1975

[54] METHOD TO IMPROVE THE ADHERANCE OF METAL FILMS DEPOSITED ON GLASS SUB-STRATES

[75] Inventor: Daniel I. Pomerantz, Lexington, Mass.

[73] Assignee: P. R. Mallory & Co., Inc., Indianapolis, Ind.

[22] Filed: Nov. 8, 1973

[21] Appl. No.: 414,048

Related U.S. Application Data

[63] Continuation of Ser. No. 197,136, Nov. 9, 1971, abandoned.

[52] U.S. Cl. .................. 427/12; 65/30; 65/99 A; 427/383
[51] Int. Cl.² ......................................... C03C 21/00
[58] Field of Search...... 117/93, 93.3, 119.6, 124 C; 65/30, 99 A

[56] References Cited
UNITED STATES PATENTS

| | | | |
|---|---|---|---|
| 3,404,020 | 10/1968 | Woolley | 117/124 C |
| 3,502,554 | 3/1970 | Fehlner | 117/124 C |
| 3,622,294 | 11/1971 | Loukes et al. | 117/124 C |
| 3,658,501 | 4/1972 | Lawrenson et al. | 65/99 A |

*Primary Examiner*—John H. Newsome
*Attorney, Agent, or Firm*—Charles W. Hoffmann; Robert F. Meyer; Donald W. Hanson

[57] ABSTRACT

Improved adherence of deposited metal upon glass substrates is obtained by applying a potential, with the deposited metal positive and the insulating material negative to such an assembly with the insulating material being at a temperature at which it is slightly conductive.

6 Claims, No Drawings

METHOD TO IMPROVE THE ADHERANCE OF METAL FILMS DEPOSITED ON GLASS SUB-STRATES

This is a continuation of application Ser. No. 197,136, filed Nov. 9, 1971, now abandoned.

SUMMARY OF THE INVENTION

It has been observed that many metals when deposited upon inorganic insulating substrates by evaporating or sputtering technique adhere very poorly to such substrates after deposition.

It is an object of the present invention to provide a method of achieving greater adherence of the deposited metals on inorganic insulating substrates.

Other objects will be apparent from the following description.

In accordance with the present invention it has been found that when a metal is deposited upon an inorganic insulating substrate such as by evaporation or sputtering that an improved adherence of the metal to the substrate can be achieved by applying a potential to the assembly with the metal as the positive and the insulating material as the negative terminal. Preferably the assembly is first heated to elevated temperature.

DETAILED DESCRIPTION

The inorganic insulating substrate may be any of the known ceramic or glass materials. Examples of glasses include quartz, borosilicate glasses, soda-lime glasses, and pyrex. Examples of ceramics include alumina, porcelain, silicon monoxide and silicon dioxide. The insulator may also consist of a film of inorganic insulating material such as silicon monoxide, silicon dioxide or silicon nitride as a coating or deposit on a conductive or nonconductive support material such as glass or silicon.

The metals which can be deposited in accordance with the present invention include precious metals such as silver, platinum and gold; refractory metals such as chromium, titanium, nickel, cobalt, tantalum, molybdenum; aluminum; and alloys of these metals in which at least 50% by weight of the alloy is made up of these metals. The preferred metals are the precious metals; gold, platinum, silver; and aluminum, and alloys of these metals. The alloys preferably contain at least 80% of one of the metals.

The particular method of forming the metal deposit is not critical. The deposit may be formed by evaporation, by cathode sputtering, or by thermal decomposition. In the event that evaporation is used, in the case of precious metals and refractory metals for example, a temperature of at least 1000°C and preferably above 1200°C may be utilized. For aluminum and aluminum alloys, a temperature of at least 850°C and preferably above 1000°C may be used. For example, for evaporation, a tungsten coil may be used to melt the metal to be deposited in a vacuum.

After deposition, the substrate and evaporated layers are heated to a temperature at which the insulative material is slightly conductive, unless the insulative material is already at such a temperature after deposition. This temperature is below the softening point and for many glasses it is near the aneallling point. It is generally within the range 150° to 1000°C. For example, in the case of a boro-silicate glass the temperature is 300° to 700°C; for a soft glass such as a soda-lime glass, about 150° to 400°C. Higher softening point glasses have higher temperatures at which the material becomes conductive; for example for quartz the temperature should be about 600° to 1000°C.

The thickness of the deposited layer may vary widely; however, it is often between 0.1 and 10 microns. The substrate thickness may vary widely but is often between 0.2 and 2 millimeters.

After heating, a potential is applied in which the metal is made positive and the insulator negative. A current density of about 0.1–100 micro amps per square milimeter for about 0.5–50 minutes may be used. Preferably about 2–8 micro amps for a period of 1 to 10 minutes is used. The voltage will vary between about 50 and about 400 volts, depending upon the current. If desired a constant current or a constant voltage source may be used. This step should not be continued too long or the metal may diffuse into the substrate and the electrical properties be adversely effected.

By way of example, precious metals such as are gold deposited upon a glass substrate the adherence is only in the area of about 50 lbs. per square inch after heating. However, after carrying out the potential application outlined above, the strength is in the area of 1,000 lbs. per square inch, and higher.

To give another example, in the case of aluminum which has been deposited upon the substrate, a strength of adherence of about 150 lbs. per square inch is often observed, after heating without application of voltage. However, after the potential application as outlined above, adherence is of the order of 2,000 lbs. per square inch and higher strengths are often observed.

To give another example, in the case of refractory metals such as molybdenum which has been deposited upon the substrate a strength of adherence of about 100 lbs. per square inch is often observed, after heating without application of voltage. However, after the potential application as outlined above, adherence is of the order of 1000 lbs. per square inch and higher strengths are often observed.

What is claimed is:

1. In a method wherein a metal taken from the class consisting of gold and aluminum is deposited on a glass substrate, the improvement comprising:
    applying an electrical potential at a current density of from about 2–8 microamps per square milimeters across said metal film and said glass substrate so as to render said metal positive and said glass substrate negative while maintaining at least said glass substrate at a temperature at which said glass substrate is slightly conductive for a period of from about 1 to 10 minutes so as to improve the adherence of said metal film to said glass substrate.

2. A method according to claim 1 wherein the voltage utilized is from about 50 to about 400 volts.

3. A method according to claim 1 wherein the deposited layer and the insulating substrate are both heated to said temperature.

4. A method according to claim 1 wherein said glass is a boro-silicate glass.

5. A method according to claim 1 wherein the heating temperature is from about 150° to about 1000°C.

6. A method according to claim 1 wherein said glass is quartz.

* * * * *